United States Patent
Ginipalli et al.

(10) Patent No.: US 7,292,577 B1
(45) Date of Patent: Nov. 6, 2007

(54) END-TO-END PRESERVATION OF VLAN PRIORITY IN CONNECTION-ORIENTED NETWORKS

(75) Inventors: Hariprasad Ginipalli, Cupertino, CA (US); Jayakumar Jayakumar, San Jose, CA (US); Durai Chinnaiah, San Jose, CA (US); Eugene Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 09/957,311

(22) Filed: Sep. 19, 2001

(51) Int. Cl.
*H04L 12/28* (2006.01)
*H04L 12/56* (2006.01)

(52) U.S. Cl. .............. 370/395; 370/392; 370/401

(58) Field of Classification Search ........ 370/395–401, 370/463–474, 229–241, 254–392; 709/224–250; 455/450
See application file for complete search history.

(56) References Cited

U.S. PATENT DOCUMENTS

| | | | |
|---|---|---|---|
| 5,684,800 A * | 11/1997 | Dobbins et al. | 370/401 |
| 5,742,604 A * | 4/1998 | Edsall et al. | 370/401 |
| 5,825,772 A * | 10/1998 | Dobbins et al. | 370/396 |
| 5,878,043 A * | 3/1999 | Casey | 370/397 |
| 5,892,912 A * | 4/1999 | Suzuki et al. | 370/395.53 |
| 6,104,700 A * | 8/2000 | Haddock et al. | 370/235 |
| 6,172,980 B1 * | 1/2001 | Flanders et al. | 370/401 |
| 6,175,569 B1 * | 1/2001 | Ellington et al. | 370/401 |
| 6,208,649 B1 * | 3/2001 | Kloth | 370/392 |
| 6,430,621 B1 * | 8/2002 | Srikanth et al. | 709/238 |
| 6,470,025 B1 * | 10/2002 | Wilson et al. | 370/462 |
| 6,654,347 B1 * | 11/2003 | Wiedeman et al. | 370/241 |
| 6,757,298 B1 * | 6/2004 | Burns et al. | 370/473 |
| 6,765,914 B1 * | 7/2004 | Jain et al. | 370/395.31 |
| 6,798,775 B1 * | 9/2004 | Bordonaro et al. | 370/392 |
| 6,862,280 B1 * | 3/2005 | Bertagna | 370/392 |
| 6,865,153 B1 * | 3/2005 | Hill et al. | 370/230.1 |
| 6,937,576 B1 * | 8/2005 | Di Benedetto et al. | 370/256 |
| 2002/0101868 A1 * | 8/2002 | Clear et al. | 370/389 |
| 2002/0107955 A1 * | 8/2002 | Rawson, III | 709/224 |
| 2005/0025160 A1 * | 2/2005 | Meier et al. | 370/395.53 |
| 2005/0259597 A1 * | 11/2005 | Benedetto et al. | 370/254 |

* cited by examiner

*Primary Examiner*—Man U. Phan
(74) *Attorney, Agent, or Firm*—Blakely, Sokoloff, Taylor & Zafman LLP (57) ABSTRACT

Virtual local area network (VLAN) identifications (VIDs) used in a local area network (LAN) are identified. The LAN is connected to a connection-oriented wide area network (WAN). Each VLAN supports multiple priorities. For each VID, each of the priorities is mapped to a service type available in the WAN. Virtual connections (VCs) are set up based using a combination of the VID and the mapping of the priorities to the service types.

16 Claims, 7 Drawing Sheets

FIG. 1
(PRIOR ART)

| VLAN Priority | Meaning |
| --- | --- |
| 7 | Reserved for future use |
| 6 | Interactive voice |
| 5 | Interactive multimedia |
| 4 | Controlled load applications (such as streaming multimedia) |
| 3 | Excellent effort (for business-critical applications) |
| 2 | Standard priority |
| 1 | Background task |
| 0 | Best effort (default for untagged packets) |

| VLAN ID | VLAN Priority | VPI/VCI | Quality of Service |
|---|---|---|---|
| 3 | 0 | 10/100 | CBR |
| 3 | 1 | 10/101 | CBR |
| 3 | 2 | 10/102 | CBR |
| 3 | 3 | 10/103 | VBR |
| 8 | 0 | 11/100 | CBR |
| 8 | 1 | 11/101 | CBR |
| 8 | 2 | 11/102 | CBR |
| 8 | 3 | 11/103 | VBR |
| 8 | 4 | 11/104 | VBR |
| 8 | 5 | 11/105 | VBR |
| 8 | 6 | 11/106 | UBR |
| 8 | 7 | 11/107 | ABR |

| VLAN ID#1 | Priority | VPI/VCI | Quality of Service | VLAN ID#2 | Priority |
|---|---|---|---|---|---|
| 3 | 0 | 10/100 | CBR | 5 | 0 |
| 3 | 1 | 10/101 | CBR | 5 | 1 |
| 3 | 2 | 10/102 | CBR | 5 | 2 |
| 3 | 3 | 10/103 | VBR | 5 | 3 |
| 8 | 0 | 11/100 | CBR | 2 | 0 |
| 8 | 1 | 11/101 | CBR | 2 | 1 |
| 8 | 2 | 11/102 | CBR | 2 | 2 |
| 8 | 3 | 11/103 | VBR | 2 | 3 |
| 8 | 4 | 11/104 | VBR | 2 | 4 |
| 8 | 5 | 11/105 | VBR | 2 | 5 |
| 8 | 6 | 11/106 | VBR | 2 | 6 |
| 8 | 7 | 11/107 | UBR | | 7 |

END-TO-END PRESERVATION OF VLAN PRIORITY IN CONNECTION-ORIENTED NETWORKS

FIELD OF THE INVENTION

The present invention relates generally to the field of network communication. More specifically, the present invention relates to a method and a system for maintaining priority of virtual local area network (VLAN) traffic across connection-oriented networks.

BACKGROUND

A VLAN is a local area network that maps workstations or nodes on a basis other than geographic location (for example, by department, type of user, or primary application). VLANs are used to regulate the access of information among nodes that reside in different multiple networks. Although these networks are physically connected, logically they are separate.

Figure 1:
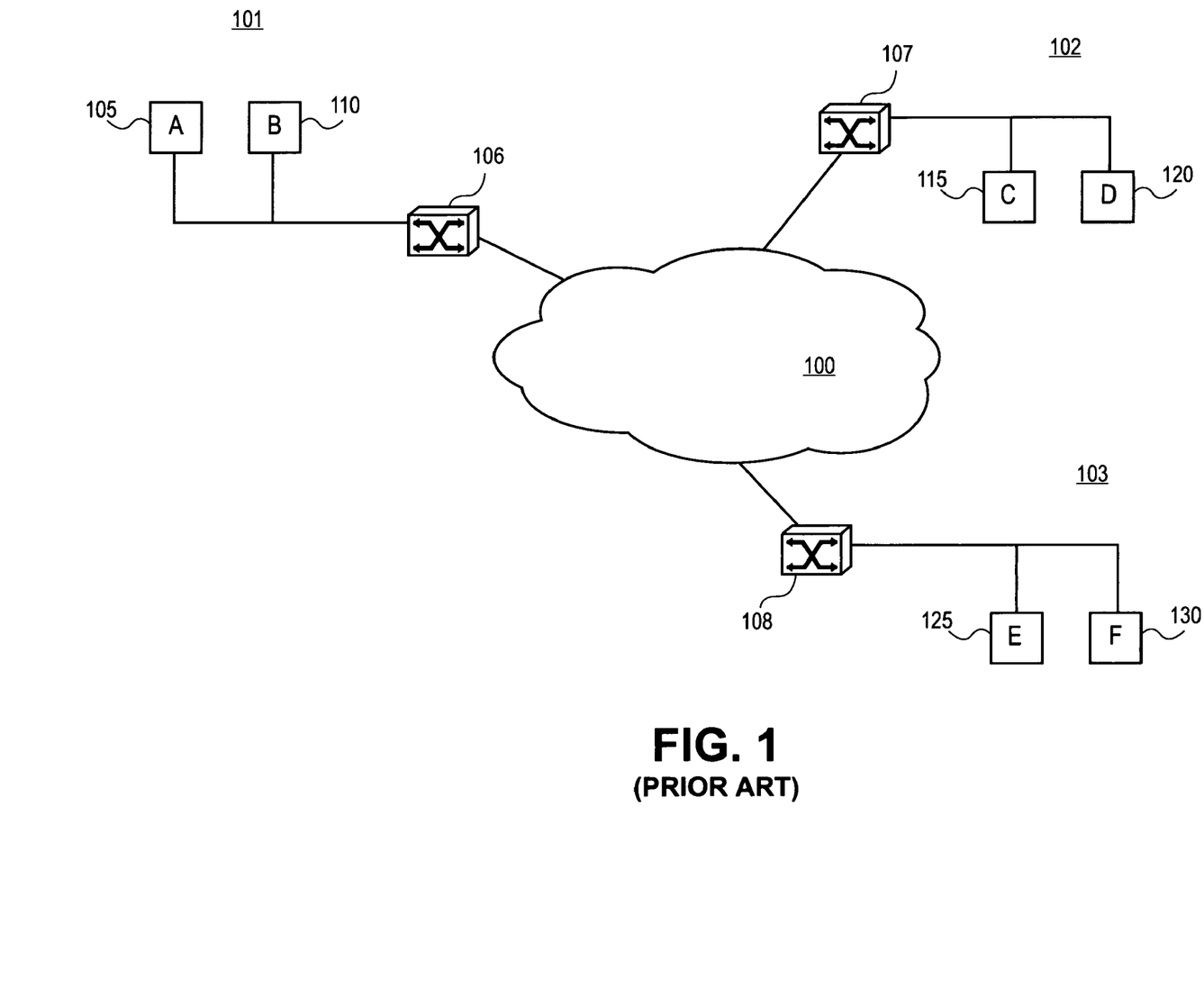
FIG. 1 is a network diagram illustrating VLANs.

FIG. 1 illustrates an example of prior art VLANs. In this example, there are three Ethernet LAN segments 101, 102 and 103 connected with each other through network 100 using switches 106, 107 and 108 respectively. Each of the switches 106, 107, 108 performs the transfer of frames from one Ethernet segment to another Ethernet segment. The Ethernet segment 101 includes nodes 105 and 110. The Ethernet segment 102 includes nodes 115 and 120. The Ethernet segment 103 includes nodes 125 and 130. Each of the nodes in the Ethernet segments 101, 102, 103 may be a workstation such as a personal computer.

VLAN traffic is generated by multiple different applications. Some of these applications are mission critical applications and demand higher priority of service than other applications. VLANs can be implemented in an Ethernet network by inserting a VLAN tag into an Ethernet frame. Originally, an Ethernet frame is defined to have a minimum frame size of 64 bytes and a maximum frame size of 1518 bytes. The maximum allowable frame size is extended by four (4) bytes to 1522 bytes to allow insertion of the VLAN tag. Of these four (4) bytes, the last two bytes or 16 bits are used as follows: the first three (3) bits are used as a priority field to assign a priority level to the Ethernet frame, the next one (1) bit is used to indicate the presence of a routing information field (RIF), the last 12 bits are used as a VLAN identifier (VID) field that uniquely identifies the VLANs to which the Ethernet frame belongs. Each VLAN gets a unique network number or identifier (using the VID field).

Referring to FIG. 1, the nodes 105 and 115 (nodes A and C) may be configured to be in a first VLAN. Similarly, the nodes 110, 120, 125 and 130 (or nodes B, D, E, and F) may be configured to be in a second VLAN. A node can belong to more than one VLAN. For example, the node 115 (or node C) may be configured to be in both the first VLAN and the second VLAN. As illustrated, the nodes in the first VLAN and in the second VLAN may be connected to different Ethernet segments. Thus, a port on the switch 106 may receive frames from the first VLAN or from the second VLAN. The switch delivers the frames based on the VID in the VLAN tag of each packet. When the node 110 (or node B) sends a broadcast message, frames associated with the broadcast message are sent only to those nodes belonging to the second VLAN (i.e., nodes D, E and F), even though the frames may cross the switches 106, 107, and 108. Each switch reads the incoming frames and, according to how the addressing (e.g., port assignment) of the network is defined, identifies each VLAN.

The network 100 may be a connection-oriented network such as, for example, an Asynchronous Transfer Mode (ATM) network and Multi-Protocol Label Switching (MPLS) network. In a connection-oriented network, there may be different type of services (e.g., bandwidth, jitter, delay, etc.) to handle different types of traffic (e.g., voice, video, data, etc.). The type of service is established at the time that the connection is made. For example, in the ATM network, the ATM Forum has defined four quality-of-service types of service that are architected to handle the different types of traffic. These types of service include Constant Bit Rate (CBR), Variable Bit Rate (VBR), Unspecified Bit Rate (UBR), Guaranteed Frame Rate (GFR), and Available Bit Rate (ABR).

CBR is a reserved bandwidth service. A contract is established between the network and the end station. The end station provides the network with parameters describing the traffic for that specific connection at call setup time. The network, in turn, allocates resources that match the parameters. VBR is also a reserved bandwidth service. The network allocates resources to the end station at call setup time in response to the traffic parameters requested by the end station. In the case of VBR, however, in addition to a peak rate, a sustainable rate and a maximum burst size are established. The sustainable rate is the upper limit of the average rate, and the maximum burst rate limits the duration of cell transmission at peak rate. GFR provides a rate guarantee for application traffic across networks. UBR is a non-reserved bandwidth service. The cell loss is unspecified, which means that the network is not required to provide resources for a proposed UBR connection. ABR is a mix of reserved and non-reserved bandwidth service. Periodically, a connection polls the network and, based upon the feedback it receives, adjusts its transmission rate.

As described above, the three bits priority field in the VLAN tag is used as a priority field to assign a priority level to the Ethernet frame. When, however, these Ethernet frames are sent across a connection-oriented network such as the ATM network 100, one connection is used. The quality of service of this connection may be CBR, VBR, GFR, UBR, or ABR. Using the above example, all Ethernet frames transmitted by the node 110 to the node 125 are transferred from the switch 106 to the switch 108 using the same connection having the same ATM quality of service. A connection is identified by its VPI/VCI. VPI is a virtual path identifier that identifies a path that an ATM cell will take. VCI is a virtual channel identifier that identifies a channel within the path that the ATM cell will take to reach its destination.

Because the same connection is used, the priority values in the VLAN tags of the Ethernet frames are not considered. As such, Ethernet frames having higher priority are treated the same by the ATM network 100 as Ethernet frames having lower priority.

SUMMARY OF THE INVENTION

A method of delivering virtual local area network (VLAN) frames across a connection-oriented network is disclosed. For one embodiment, VLAN identifications (VIDs) used in a local area network (LAN) are identified. The LAN is connected to a connection-oriented wide area network (WAN). Each VLAN supports multiple priorities. For each VID, each of the priorities is mapped to a service type available in the WAN. Virtual connections (VCs) are set up based using a combination of the VID and the mapping of the priorities to the service types.

Other features and advantages of the present invention will be apparent from the accompanying drawings and from the detailed description which follows.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

For one embodiment, a method and a system for transmitting prioritized Virtual Local Area Network (VLAN) traffic across a connection-oriented network is disclosed. Supported VLAN priorities are mapped to appropriate virtual connections (VC) before the VLAN traffic enters the network. Traffic from each virtual connection is mapped into VLAN traffic when it exits the network.

Figure 2:
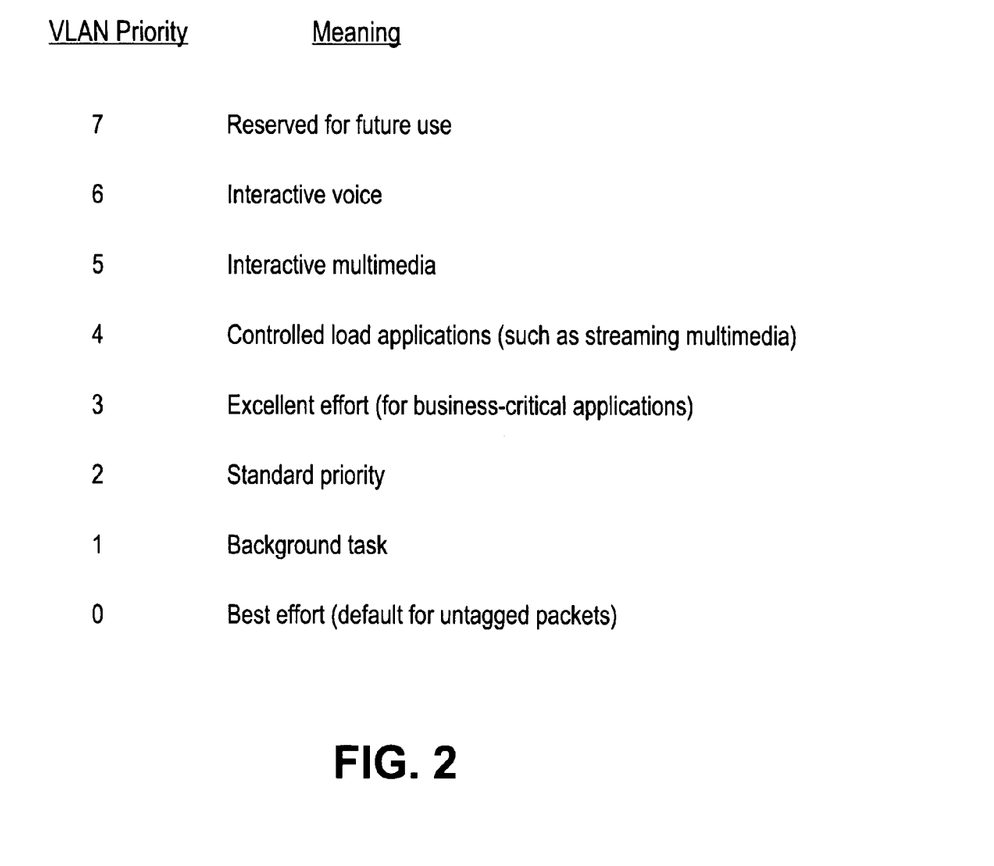
FIG. 2 is a table illustrating one example of how the eight possible priority values are assigned.

The VLAN tag includes a three-bit priority field that allows for prioritization of VLAN traffic over the Ethernet LANs. The VLAN tag allows a device to establish up to eight priority values in identifying traffic for a specific VLAN. For example, when a frame is received, it is prioritized based on the VLAN it belongs to or based on the priority field it contains and placed in appropriate queue. The frames having the highest priority are emptied first from the queue. More important VLAN traffic (e.g., real time traffic) is given higher priority value than less important VLAN traffic (e.g., email). FIG. 2 is a table illustrating one example of how the eight possible priority values are assigned to VLAN traffic using the priority field in the VLAN tag.

Typically in the prior art, the VLAN traffic is transmitted across a connection-oriented network using one connection. The transmission priority of the VLAN traffic is thus dependent on the quality of service associated with that connection. Higher priority VLAN traffic is treated the same as lower priority VLAN traffic. For one embodiment of the present invention, multiple virtual connections are used to give the VLAN traffic different quality of service corresponding to the different VLAN priority values. For example, VLAN traffic having a highest priority value may be sent across a virtual connection (VC) set up with a constant bit rate (CBR) quality of service. VLAN traffic having a next highest priority value may be sent across a VC set up with a variable bit rate (VBR).

The multiple virtual connections allow the VLAN traffic to be treated with different quality of service corresponding to the different VLAN priority values. When the Ethernet VLAN traffic arrives on an ingress line card of a switch, the frames are mapped into different classes of service based on the VLAN priority value. For the same VID, based on the three-bit VLAN priority value, frames are mapped into dedicated ATM connections. Each of these ATM connections is mapped to different classes of service. Note that the types of service offered by the connection-oriented network may not match exactly with the number of priority values defined in the VLAN. Thus, having multiple virtual connections enables the prioritized VLAN traffic to be transmitted across the network using different classes of service.

Figure 3:
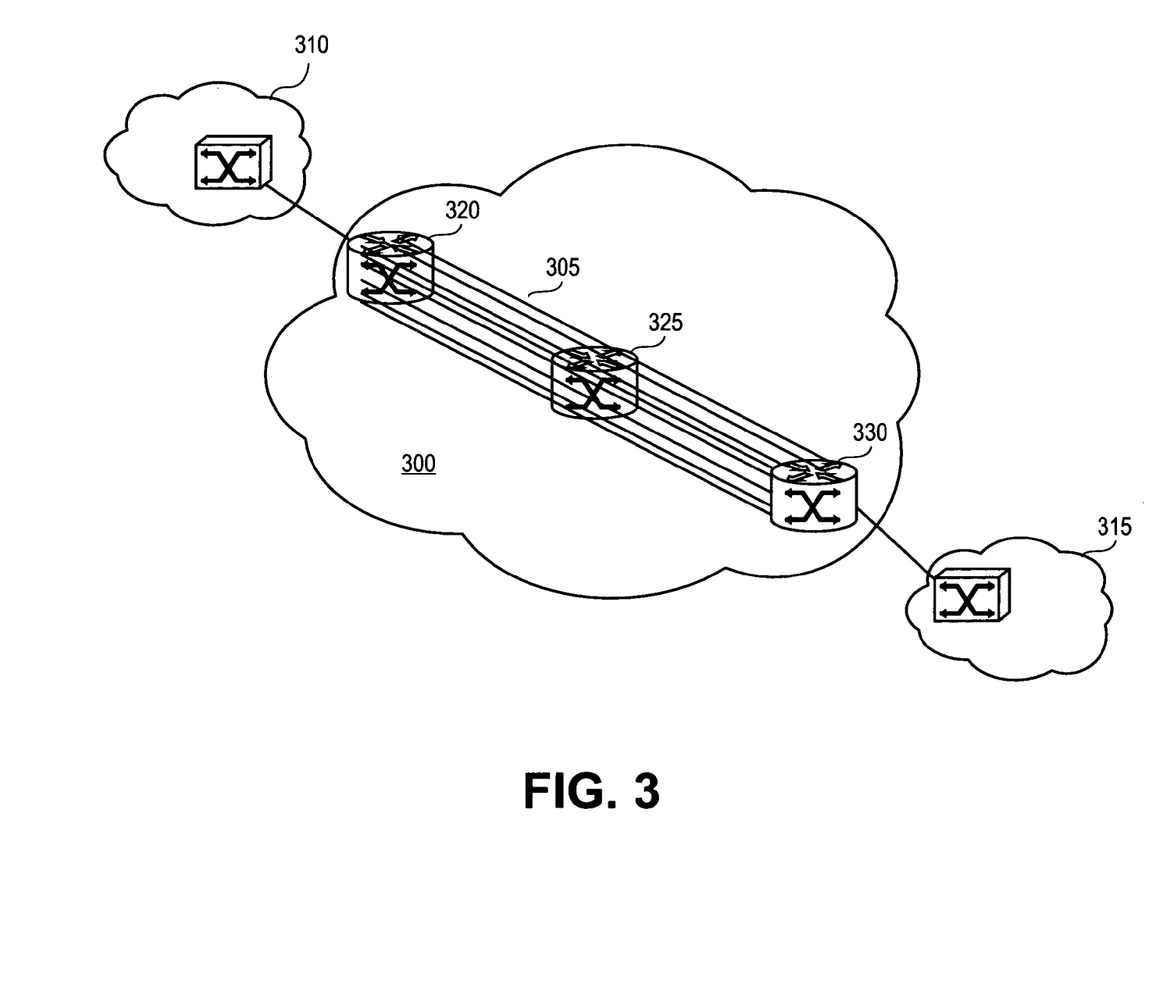
FIG. 3 is a network diagram illustrating multiple virtual connections (VC) to accommodate different VLAN priority values.

FIG. 3 is a network diagram illustrating multiple virtual connections to transmit VLAN traffic with different priority values. Instead of having one virtual connection to transmit the VLAN traffic, multiple virtual connections 305 are used. For example, when the priority bits are set up such that there are four valid priorities, four virtual connections are set up. The VLAN traffic from the Ethernet network 310 is mapped into these virtual connections 305 when the VLAN traffic enters the network 300. Switch 320 is referred to as a source end point, and switch 330 is referred to as a destination end point.

When the switch 320 receives an Ethernet frame, the switch 320 looks at the VLAN tag (including the VID and the priority field) and maps the Ethernet frame to the appropriate virtual connection. The VLAN traffic may cross multiple switches (e.g., switches 320, 325, 330) before it arrives at the destination network 315. Depending on how the VLAN is setup in the network 315, the VLAN traffic is then mapped by the switch 330 from the virtual connections to the Ethernet frame as defined by the network 315.

Figure 4:
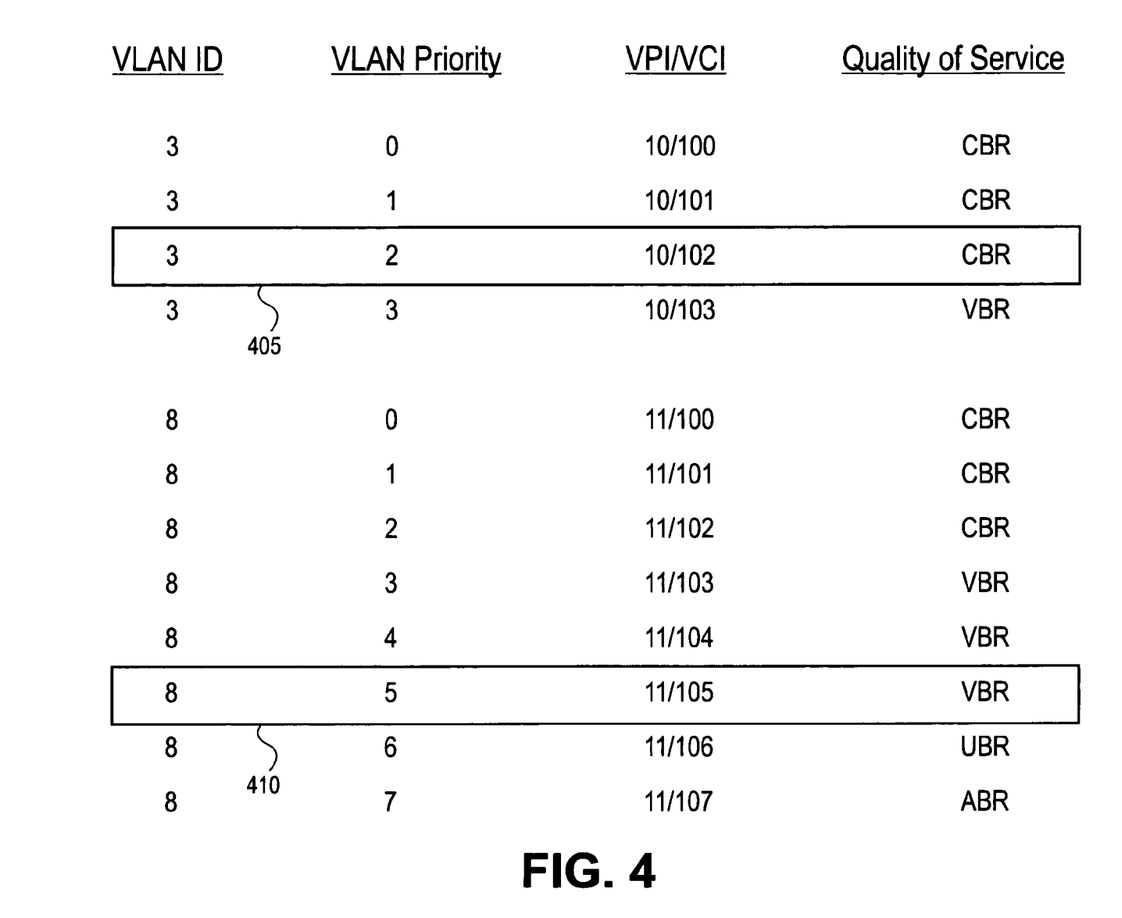
FIG. 4 is a table illustrating mapping of VLAN priorities to virtual connections (VC).

FIG. 4 is a table that illustrates mapping of VLAN priorities to virtual connections (VC). The column under the heading "VLAN ID" lists the different VLAN IDs for VLAN traffic entering a network. In this example, there are two VLANs having the VLAN IDs of three (3) and eight (8) respectively. The column under the heading "Priority" lists the different priorities defined for these VLANs. In this example, there are four (4) possible priority values defined for the VLAN having the VLAN ID of three (3), and there are eight (8) possible priority values defined for the VLAN having the VLAN ID of eight (8).

The column under the heading "VPI/VCI" lists the different VCs for the VLAN traffic to be mapped to. For example, box 405 shows the VLAN traffic having the VID=3 and the priority value=2 is mapped to the VC where the VPI/VCI=10/102. Similarly, box 410 shows the VLAN traffic having the VID=8 and the priority value=5 is mapped to the VC where the VPI/VCI=11/105. The column under the heading "Quality of Service" lists the different types of service including CBR, VBR, UBR and ABR. Using this table, VLAN traffic having the VLAN ID=3 may be sent to any one of the four (4) possible VCs depending on the corresponding VLAN priority value. Similarly, VLAN traffic having the VLAN ID=8 may be sent to any one of the eight (8) possible VCs depending on the corresponding VLAN priority value. Generally, higher priority VLAN traffic is sent to a VC associated with a more reliable type of service.

The VLAN ID may be different in each Ethernet LAN segment even though the nodes may belong to the same VLAN. Using the example described above with FIG. 1, the second VLAN includes the nodes 110, 120, 125 and 130. The VID for the node 110 may be different from the VID for the nodes 125 and 130. Similarly, the VID for the node 110 may be different from the VID for the node 120. Each of the switches 106, 107, and 108 needs to be able to recognize that these nodes belong to the same VLAN. For example, when a broadcast message is transmitted by the node 110 having a VID of eight (8), the switch 107 recognizes that the message is to be delivered to the node 120 even though the node 120 may have a VID of five (5). Similarly, the switch 108 recognizes that the message is to be delivered to the nodes 125 and 130 even though the nodes 125 and 130 may have a VID of two (2).

Figure 5:
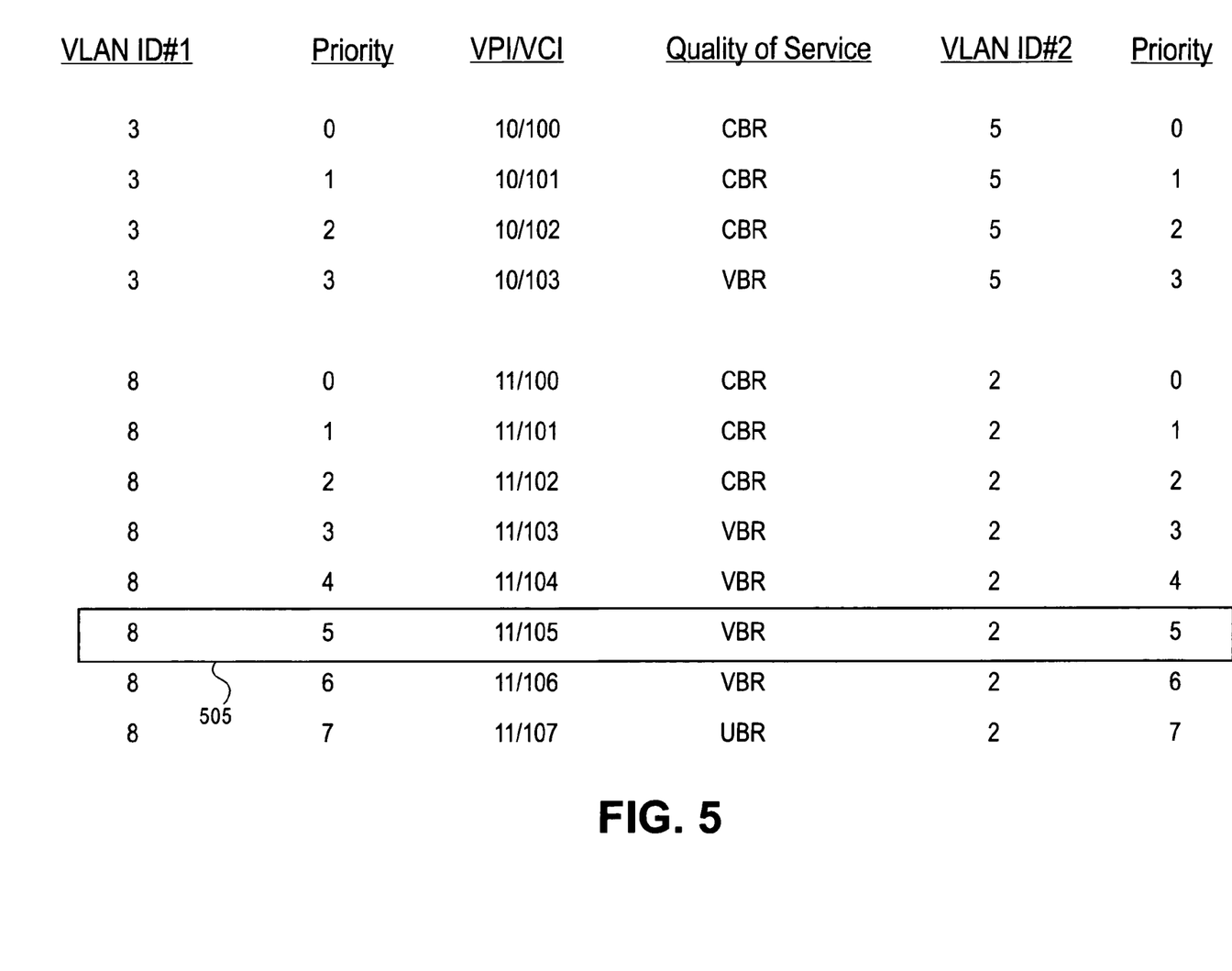
FIG. 5 is a table illustrating translation of VLAN IDs in different LAN segments.

FIG. 5 is a table illustrating translation of VIDs in different Ethernet LAN segments. Depending on how the VID is allocated in each Ethernet LAN segment, the VID can be translated from one value to another value. The column under the heading "VLAN ID#1" lists the different VLAN IDs for VLAN traffic entering a network. In this example, there are two VLANs having the VLAN IDs of three (3) and eight (8) respectively. The column under the heading "Priority" is the same as described in FIG. 4 for the column under the heading "VLAN Priority". The columns under the headings "VPI/VCI" and "Quality of Service" are the same as described in FIG. 4.

The column under the heading "VLAN ID#2" lists the different VLAN IDs for VLAN traffic leaving the network. In this example, there are two VLANs having the VLAN IDs of five (5) and two (2) respectively. Note that the column under the second "priority" heading lists the same priority values as those listed in the column under the first "priority" heading. Using this translation table, the VLAN traffic from a source node can be sent across a network and delivered to an intended destination node even though the VLAN ID of the source node and of the destination node may be different. For example, box 505 indicates that a source VLAN traffic having the VID=8 and the priority value=5 is sent across a network and delivered to a destination having the VID=2 and the priority value=5.

Figure 6:
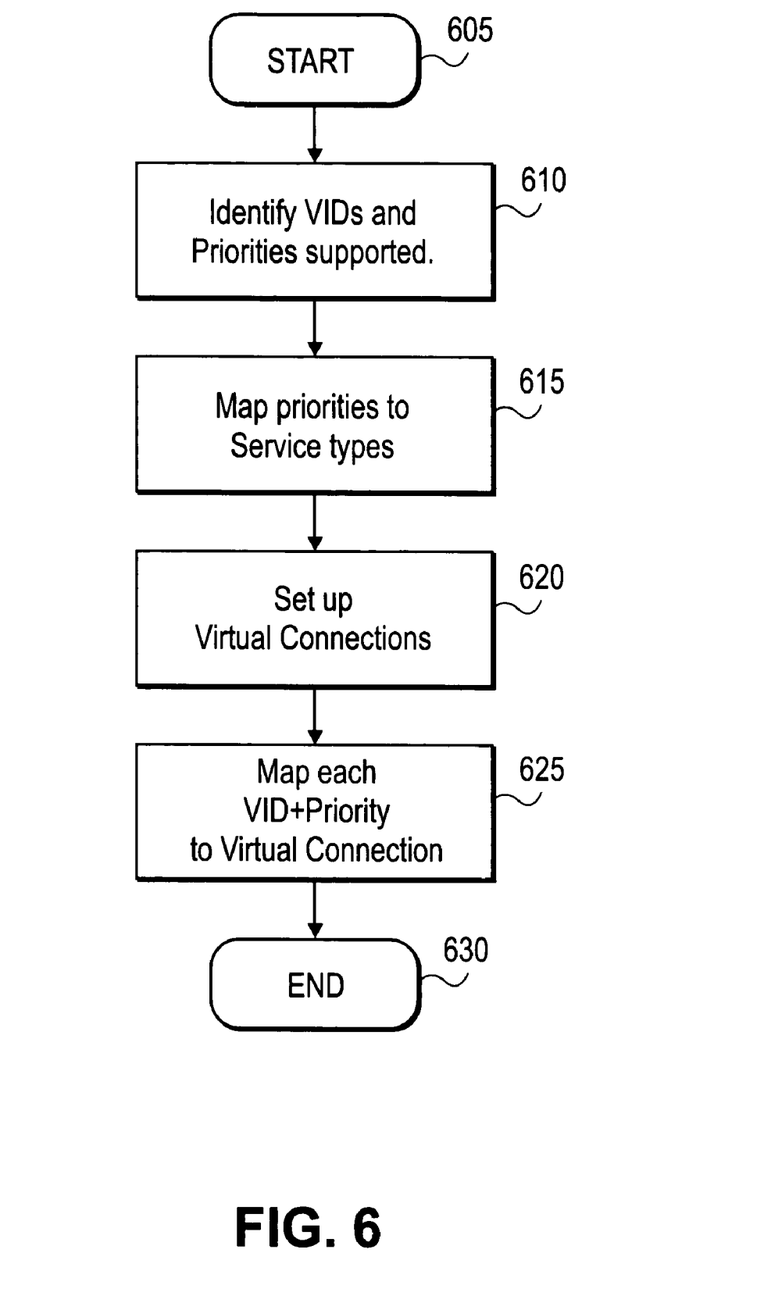
FIG. 6 is a flow diagram illustrating one embodiment of a VLAN to virtual connection mapping process.

FIG. 6 is a flow diagram illustrating one embodiment of a VLAN to virtual connection mapping process. The process starts at block 605 from a source end point. At block 610, the VID and the priorities supported by the VLAN having that VID are identified. At block 615, the supported priorities are mapped to the different service types available in the connection-oriented network. For example, priority six (6) is mapped to CBR; priority five (5) is mapped to CBR; priority zero (0) is mapped to UBR, etc. At block 620, VCs are set up corresponding to a service type. The number of VCs setup is based on the number of VID and priorities combination supported by the VLAN. For example, the table in FIG. 4 indicates under the column with the heading VPI/VCI that there are twelve (12) virtual connections that need to be set up. At block 625, each combination of the VID and one of the supported priorities is mapped to a virtual connection. The virtual connection is mapped to a type of service based on the mapping performed in block 615. The process ends at block 630.

At a destination end point, a reverse of the VLAN-to-virtual connection mapping process is performed based on the mapping information used at the source end point. For example, referring to FIG. 5, block 505 indicates that traffic received from the VC having the VPI/VCI of 11/105 corresponds to VLAN traffic having VID of two (2) and VLAN priority of 5.

Figure 7:
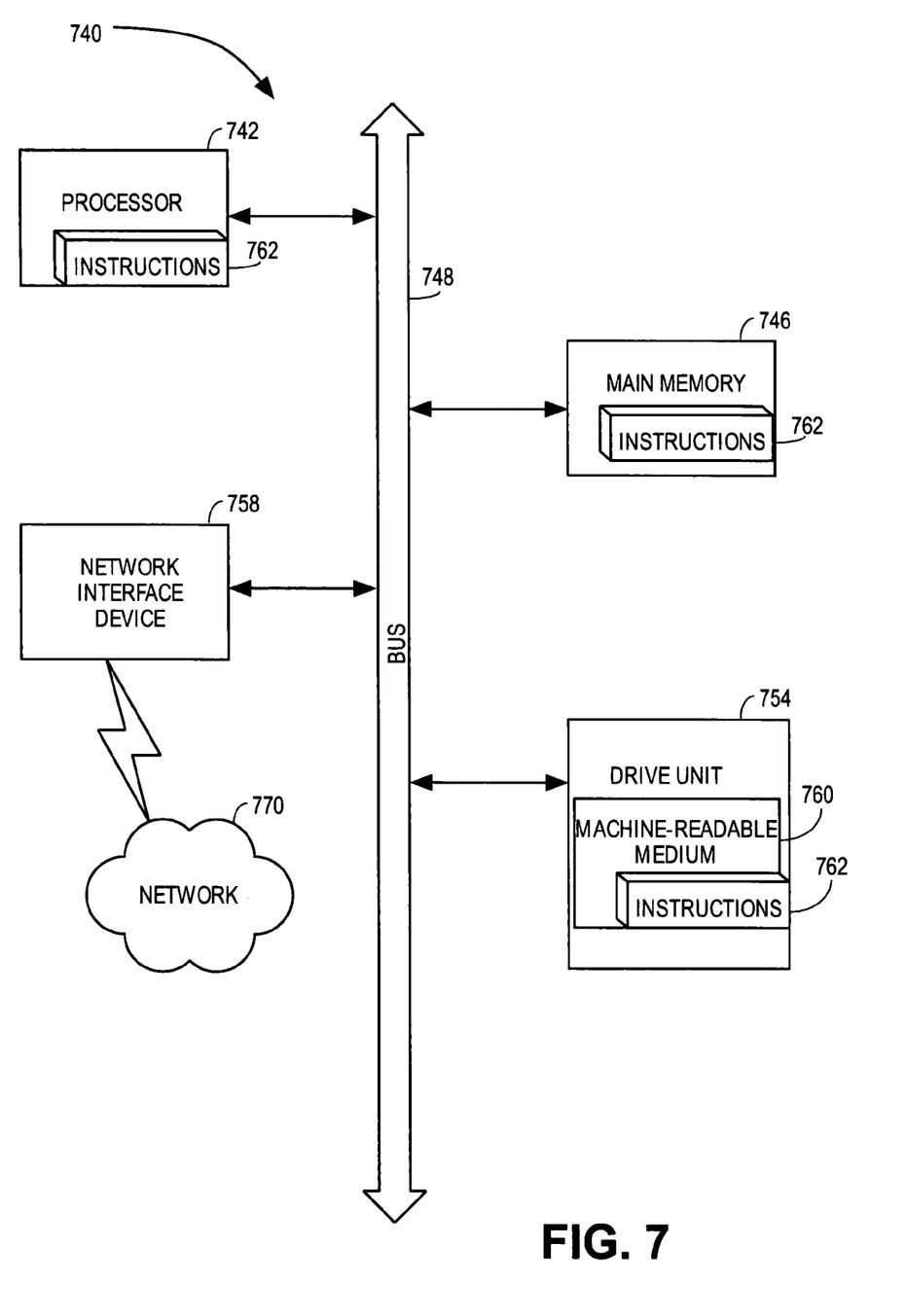
FIG. 7 is an illustration of one embodiment of a digital processing system that can be used with one embodiment of the present invention.

FIG. 7 is an illustration of one embodiment of a digital processing system that can be used with the present invention. The operations of the various methods of the present invention may be implemented by a processing unit 742 in a digital processing system 740. The processing unit 742 is coupled with the bus 748 and executes sequences of computer program instructions 762. For example, the computer program instructions 762 may include instructions to perform the virtual connection mapping process illustrated in FIG. 6. The instructions 762 may be stored in a memory which may be considered to be a machine-readable storage media 760. The machine-readable storage media 760 may be used with a drive unit 754 coupled with the bus 748. The instructions 762 may be loaded into main memory 746 coupled with the bus 748. Although not shown, other memory devices such as, for example, read-only memory, a persistent storage memory, or any combination of these devices may also be used to store the instructions 762.

Execution of the sequences of instruction 762 causes the processing unit 742 to perform operations according to the present invention. The instructions 762 may be loaded into the main memory 746 from a storage device or from one or more other digital processing systems (e.g. a server computer system) over a network 770 using network interface device 758. In other cases, the instructions 762 may not be performed directly or they may not be directly executable by the processing unit 742. Under these circumstances, the executions may be executed by causing the processing unit 742 to execute an interpreter that interprets the instructions 762, or by causing the processing unit 742 to execute instructions which convert the received instructions 762 to instructions which can be directly executed by the processor.

For other embodiments, hard-wired circuitry may be used in place of or in combination with software instructions to implement the present invention. Thus, the present invention is not limited to any specific combination of hardware circuitry and software, nor to any particular source for the instructions executed by the digital processing system 740.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   identifying priorities used in a source virtual local area network (VLAN);
   identifying VLAN identifications (VIDs) used in the source VLAN;
   mapping the priorities in the source VLAN to two or more service types available in a connection-oriented network to transmit VLAN traffic from the source VLAN to a destination VLAN; and
   setting up a connection table having multiple virtual connections (VCs) to transmit the VLAN traffic, wherein the connection table is set up based on the VIDs used in the source VLAN and the mapping of the priorities used in the source VLAN such that each combination of the VIDs and the priorities is mapped to a different VC.

2. The method of claim 1, wherein mapping the priorities used in the source VLAN to the two or more service types comprises mapping a high priority to a more reliable service type.

3. The method of claim 1, further comprising:
   when the VLAN traffic arrives at the destination VLAN, converting the VID used in the source VLAN to a VID used in the destination VLAN.

4. The method of claim 1, wherein the connection-oriented network is an asynchronous transfer mode (ATM) network.

5. A computer readable medium having stored thereon sequences of instructions which are executable by a system, and which, when executed by the system, cause the system to:
identify priorities used in a source virtual local area network (VLAN);
identify VLAN identifications (VIDs) used in the source VLAN;
map the priorities in the source VLAN to two or more service types available in a connection-oriented network to transmit VLAN traffic from the source VLAN to a destination VLAN; and
set up a connection table having multiple virtual connections (VCs) to transmit the VLAN traffic, wherein the connection table is set up based on the VIDs used in the source VLAN and the mapping of the priorities used in the source VLAN such that each combination of the VIDs and the priorities is mapped to a different VC.

6. The computer readable medium of claim 5, wherein the instructions to map the priorities used in the source VLAN to the two or more service types comprises instructions to map a high priority to a more reliable service type.

7. The computer readable medium of claim 5, further comprising instructions to:
when the VLAN traffic arrives at the destination VLAN, convert the VID used in the source VLAN to a VID used in the destination VLAN.

8. The computer readable medium of claim 5, wherein the connection-oriented network is an asynchronous transfer mode (ATM) network.

9. A system, comprising:
a bus;
a memory coupled to the bus;
a processor coupled to the memory and the bus, the processor is configured to execute instructions to:
identify priorities used in a source virtual local area network (VLAN);
identify VLAN identifications (VIDs) used in the source VLAN;
map the priorities in the source VLAN to two or more service types available in a connection-oriented network to transmit VLAN traffic from the source VLAN to a destination VLAN; and
set up a connection table having multiple virtual connections (VCs) to transmit the VLAN traffic, wherein the connection table is set up based on the VIDs used in the source VLAN and the mapping of the priorities used in the source VLAN such that each combination of the VIDs and the priorities is mapped to a different VC.

10. The system of claim 9, wherein the instructions to map the priorities used in the source VLAN to the two or more service types comprises instructions to map a high priority to a more reliable service type.

11. The system of claim 9, further comprising instructions to:
when the VLAN traffic arrives at the destination VLAN, convert the VID used in the source VLAN to a VID used in the destination VLAN.

12. A system, comprising:
means for mapping virtual local area network (VLAN) priorities in a source VLAN to service types available in a connection-oriented network; and
means for transmitting VLAN traffic from the source VLAN to a destination VLAN across the connection-oriented network using the mapping of the priorities, wherein each combination of the VIDs and the VLAN priorities is mapped to a different virtual connection (VC) such that a high priority is mapped to a more reliable service type.

13. The system of claim 12, further comprising means for setting up a connection table using the mapping of the VLAN priorities and VLAN identifications (VIDs), wherein each combination of the VIDs and the VLAN priorities is mapped to a different virtual connection (VC) in the connection table.

14. An apparatus, comprising:
a bus;
a processor coupled to the bus;
a memory coupled to the processor and the bus, the memory comprising a connection table having two or more virtual connections (VCs) to transmit virtual local area network (VLAN) traffic from a VLAN across a connection-oriented network, the VLAN associated with a VLAN identification and having multiple frame priorities, wherein each combination of the VID and one of the multiple frame priorities is mapped to a different VC and the VLAN traffic is transmitted across the connection-oriented network such that a VLAN frame having a higher priority is transmitted over a more reliable VC than a VLAN frame having a lower priority.

15. An apparatus, comprising:
means for setting up a connection table having two or more virtual connections (VCs) to transmit virtual local area network (VLAN) traffic from a VLAN across a connection-oriented network, the VLAN associated with a VLAN identification (VID) and having multiple frame priorities; and
means for mapping each of the multiple frame priorities to one of multiple service types available in the connection-oriented network such that each combination of the VID and the priorities is mapped to a different VC.

16. The apparatus of claim 14, wherein each of the multiple frame priorities is mapped to one of multiple service types available in the connection-oriented network such that a higher priority is mapped to a more reliable service type.

* * * * *